United States Patent
Ueta

(10) Patent No.: US 11,819,922 B2
(45) Date of Patent: Nov. 21, 2023

(54) SILVER NANOWIRE MANUFACTURING METHOD

(71) Applicant: SEIKO PMC CORPORATION, Tokyo (JP)

(72) Inventor: Yasuhiro Ueta, Chiba (JP)

(73) Assignee: SEIKO PMC CORPORATION, Tokyo (JP)

( * ) Notice: Subject to any disclaimer, the term of this patent is extended or adjusted under 35 U.S.C. 154(b) by 171 days.

(21) Appl. No.: 17/434,757

(22) PCT Filed: Feb. 7, 2020

(86) PCT No.: PCT/JP2020/004887
§ 371 (c)(1),
(2) Date: Aug. 29, 2021

(87) PCT Pub. No.: WO2020/179354
PCT Pub. Date: Sep. 10, 2020

(65) Prior Publication Data
US 2022/0168806 A1 Jun. 2, 2022

(30) Foreign Application Priority Data
Mar. 1, 2019 (JP) .................................. 2019-037851

(51) Int. Cl.
*B22F 9/24* (2006.01)
*B22F 1/054* (2022.01)

(52) U.S. Cl.
CPC .............. *B22F 9/24* (2013.01); *B22F 1/0547* (2022.01); *B22F 2301/255* (2013.01)

(58) Field of Classification Search
None
See application file for complete search history.

(56) References Cited

U.S. PATENT DOCUMENTS

| | | | |
|---|---|---|---|
| 2008/0210052 A1 | 9/2008 | Allemand | |
| 2009/0311530 A1 | 12/2009 | Hirai et al. | |
| 2013/0034803 A1* | 2/2013 | Adzic | H01G 11/46 |
| | | | 977/773 |
| 2015/0232628 A1* | 8/2015 | Han | B22F 1/0553 |
| | | | 427/539 |
| 2016/0162063 A1* | 6/2016 | Lovenich | H10K 50/816 |
| | | | 428/209 |
| 2018/0361482 A1* | 12/2018 | Moglianetti | B22F 9/24 |

FOREIGN PATENT DOCUMENTS

| | | |
|---|---|---|
| CN | 103167920 | 6/2013 |
| CN | 107000065 | 8/2017 |
| CN | 108430676 | 8/2018 |
| JP | 2009299162 | 12/2009 |
| JP | 2014162946 | 9/2014 |
| JP | 2017515983 | 6/2017 |
| WO | 2018071538 | 4/2018 |

OTHER PUBLICATIONS

"Office Action of China Counterpart Application", dated Dec. 1, 2022, with English translation thereof, p. 1-p. 12.
"International Search Report (Form PCT/ISA/210) of PCT/JP2020/004887," dated Mar. 17, 2020, with English translation thereof, pp. 1-4.

* cited by examiner

*Primary Examiner* — George Wyszomierski
(74) *Attorney, Agent, or Firm* — JCIPRNET

(57) ABSTRACT

The present invention addresses the problem of providing a method that enables easy manufacturing of silver nanowires which have an average diameter smaller than those obtained from methods in the related art and in which the proportion of large diameter silver nanowires is reduced. Provided is a method for manufacturing silver nanowires, in which the silver nanowires are obtained from a silver salt using the silver salt, a halide salt, and a growth control agent in a polyol, and at least one selected from the group consisting of α-angelica lactone, phthalide, and a compound represented by General Formula (1) below (in General Formula (1), $R^1$ and $R^3$ each represent an alkyl group having 1-4 carbon atoms, and $R^2$ represents a hydrogen atom, a hydroxyl group, an alkoxyl group having 1-4 carbon atoms, or a acyloxy group having 2-6 carbon atoms) is further used as a furanone derivative (a).

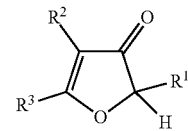

20 Claims, No Drawings

SILVER NANOWIRE MANUFACTURING METHOD

TECHNICAL FIELD

The present invention relates to a silver nanowire manufacturing method in which a silver salt is reacted in a polyol in the presence of a growth control agent, a halide salt, and a specific furanone derivative.

BACKGROUND ART

In recent years, use of display devices such as a liquid crystal display, a plasma display, an organic electroluminescence display, and electronic paper, input sensors such as a touch panel, and solar cells, such as a thin-film amorphous Si solar cell and a dye-sensitized solar cell, in which sunlight is used has increased, and the demand for transparent conductive films that are essential members for these devices has also increased.

In the related art, iridium tin oxide (ITO) has been mainly used as a material for these transparent conductive films. Although high transparency and conductivity can be obtained in such thin films in which ITO is used, the thin films are generally manufactured using a sputtering device or a vapor deposition device, which is problematic in terms of production speed and manufacturing costs. Furthermore, since indium which is a raw material of ITO is a rare metal for which stable supply has become a problem, development of alternative materials for ITO is required.

One example of materials attracting attention as transparent conductive films which are substitutes for ITO includes metal nanowires. Since metal nanowires have a small diameter and high light transmittance in a visible light region, they can be applied to transparent conductive films. In particular, transparent conductive films in which silver nanwires are used have been attracting attention since they have high conductivity and stability.

A manufacturing method for reacting a silver compound, which is a source of silver nanowires, with halide ions and a growth control agent using a polyol such as ethylene glycol acting as a reducing agent as a solvent has been proposed as a method for manufacturing such silver nanowires (for example, refer to Patent Literature 1).

However, only silver nanowires having an average diameter exceeding 60 nm can be obtained in the method of Patent Literature 1. In general, silver nanowires having a large diameter in transparent conductive films containing the silver nanowires have low light transmittance and increased haze. Since silver nanowires in which the proportion of silver nanowires with a large diameter is small and which have a low average diameter are considered to be preferable when manufacturing transparent conductive films, desired properties that can be obtained are insufficient due to the excessive diameter of silver nanowires obtained through the method of Patent Literature 1.

A production method using bromide ions has been proposed (for example, refer to Patent Literature 2) as a method for manufacturing silver nanowires having a small average diameter, for example. Specifically, silver nanowires having an average diameter of less than 50 nm can be obtained using the manufacturing method of Patent Literature 2. However, it is necessary to set the reaction time longer since bromide ions will be added later, which is disadvantageous from the viewpoint of productivity. In addition, since additives are instantaneously added at a reaction temperature due to a small scale of the reaction, this condition is difficult to apply to a large-scale reaction, which is problematic in terms of reproducibility in large-scale production. In addition, it cannot be said that satisfactory results can be obtained regarding the proportion of silver nanowires having a large diameter only by using bromide ions.

In addition, it is reported in Patent Literature 3 that, as a method for manufacturing silver nanowires which have a small average diameter and in which the proportion of silver nanowires having a large diameter is also small, a silver nanowire coating solution which has an aspect ratio of at least 3 and in which more than 80% of a silver nanostructure has a diameter of less than 25 nm can be obtained by using a specific additive and adding silver salt in two stages. However, in this method, because silver salt is added two times, the synthesis procedure is complicated and it takes time to manufacture silver nanowires, which is problematic.

Although some methodologies for reducing the average diameter of silver nanowires have been reported in this manner, techniques of performing manufacturing simply are still required.

REFERENCE LIST

Patent Literature

Patent Literature 1: US2008/0210052

Patent Literature 2: Japanese Patent Laid-Open No. 2014-162946

Patent Literature 3: Published Japanese Translation No. 2017-515983

SUMMARY

Technical Problem

The present invention has been made in view of the above-described problems in the technology in the related art, and an objective of the present invention is to provide a method that enables easy manufacturing of silver nanowires which have an average diameter smaller than hose obtained from methods in the related art and in which the proportion of large diameter silver nanowires is reduced.

Solution to Problem

The present inventors have conducted extensive studies in order to solve the problems, and as a result, have found that the above-described problems can be solved in a case of using a silver nanowire manufacturing method in which a growth control agent, a halide salt, and a silver salt are reacted with each other in the presence of a specific furanone derivative in a polyol, thus leading to realization of the present invention.

That is, the present invention relates to the following.

<1> A method for manufacturing silver nanowires, in which the silver nanowires are obtained from a silver salt using the silver salt, a halide salt, and a growth control agent in a polyol, and at least one selected from the group consisting of α-angelica lactone, phthalide, and a compound represented by General Formula (1) below is further used as a furanone derivative (a).

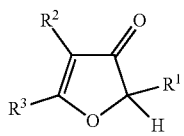

[General Formula (1)]

(In General Formula (1), $R^1$ and $R^3$ each represent an alkyl group having 1-4 carbon atoms, and $R^2$ represents a hydrogen atom, a hydroxyl group, an alkoxyl group having 1-4 carbon atoms, or an acyloxy group having 2-6 carbon atoms).

<2> The method for manufacturing silver nanowires according to <1>, in which a molar ratio of the furanone derivative (a) to silver atoms in the silver salt is 0.07 to 0.35.

<3> The method for manufacturing silver nanowires according to <1> or <2>, in which the furanone derivative (a) is at least one selected from the group consisting of 2,5-dimethyl-4-methoxy-3(2H)-furanone, 2,5-dimethyl-4-hydroxy-3(2H)-furanone, and phthalide.

<4> The method for manufacturing silver nanowires according to any one of <1> to <3>, in which a reaction is further carried out in the presence of an α-hydroxycarbonyl compound (b) represented by General Formula (2).

(b)

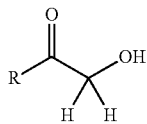

[General Formula (2)]

(In General Formula (2), R represents either a hydrogen atom or a hydrocarbon having 1-6 carbon atoms).

<5> The method for manufacturing silver nanowires according to <4>, in which the α-hydroxycarbonyl compound (b) is hydroxyacetone and/or α-hydroxyacetophenone.

<6> The method for manufacturing silver nanowires according to <4> or <5>, in which a molar ratio of the α-hydroxycarbonyl compound (b) to silver atoms in the silver salt is 0.5 to 3.5.

Advantageous Effects of Invention

According to the silver nanowire manufacturing method of the present invention, silver nanowires which have an average diameter smaller than those obtained from methods in the related art and in which the proportion of silver nanowires having a diameter of 60 nm or more is reduced can be manufactured without undergoing a complicated reaction process.

DESCRIPTION OF THE EMBODIMENTS

Hereinafter, the present invention will be described in detail.
[Polyol]
A polyol used in the present invention is not particularly limited as long as it is a compound capable of reducing silver ions, and at least one compound having two or more hydroxyl groups can be appropriately selected depending on the purpose.

Examples of polyols that can be preferably used in the present invention include: diols such as ethylene glycol, propanediol, butanediol, pentanediol, hexanediol, diethylene glycol, dipropylene glycol, triethylene glycol, and tripropylene glycol and isomers thereof; triols such as glycerin, butanetriol, pentanetriol, and hexanetriol and isomers thereof; tetraols such as butanetetraol, pentanetetraol, and hexanetriol and isomers thereof; pentaols such as pentanepentaol and hexanepentaol and isomers thereof; and hexaols such as hexanehexaol and isomers thereof. Among these, a diol of a saturated hydrocarbon having 1-5 carbon atoms and a triol of a saturated hydrocarbon having 1-5 carbon atoms are preferable from the viewpoint that they are liquids at normal temperatures and easily dissolve a growth control agent. Among these, ethylene glycol, 1,2-propanediol (propylene glycol), 1,3-propanediol, 1,3-butanediol, and glycerin are preferably used, and propylene glycol is more preferably used.
[Growth Control Agent]

The growth control agent used in the present invention is not particularly limited, and at least one polymer can be appropriately selected depending on the purpose. Specific examples thereof include polymers having at least one monomer unit skeleton selected from vinylpyrrolidone, (meth)acrylamide, N-substituted (meth)acrylamide, and (meth)acrylic acid and derivatives thereof, and vinyl alcohol. Among these, a polymer having an amide structure is preferable, a polymer having at least one monomer unit skeleton selected from vinylpyrrolidone and N-substituted (meth)acrylamide is more preferable, and polyvinyl pyrrolidone is still more preferable. Here, the N-substituted (meth) acrylamide is not particularly limited as long as one or more hydrogen atoms at the N-position of (meth)acrylamide are substituted with a functional group such as an alkyl group, a hydroxyalkyl group, an aryl group, or an alkoxyalkyl group. In addition, the molecular structure of the polymer may be a linear structure, or a cross-linked structure to the extent that solubility in a dispersion solvent is not impaired.

The higher the weight-average molecular weight of a growth control agent, the more the formation of silver fine particles can be suppressed and the better the yield of silver nanowires. Moreover, in a case where the weight-average molecular weight is significantly high, the silver nanowires are likely to become thicker. Therefore, the weight-average molecular weight thereof is preferably 10,000 to 3,000,000 and more preferably 20,000 to 2,000,000.

The growth control agent used in the present invention based on a reaction solution is preferably used in an amount of 0.2 to 10 mass % and more preferably used in an amount of 0.4 to 8 mass %. By setting the concentration of a growth control agent to 0.2 mass % or more, the effect of suppressing variation in diameters of wires is enhanced and the yield is improved. On the other hand, by setting the concentration of a growth control agent to 10 mass % or less, the operation of removing a growth control agent when isolating the silver nanowires becomes easier, which is preferable from the viewpoint of manufacturing costs.
[Halide Salt]

The halide salt used in the present invention is not particularly limited as long as it is a compound obtained by dissociating halide ions by dissolving inorganic salts or organic salts in a polar solvent, and at least one compound can be appropriately selected depending on the purpose. Specific examples of halide salts include: alkali metal chlorides such as lithium chloride, sodium chloride, and potassium chloride; alkali metal bromides such as lithium bromide, sodium bromide, and potassium bromide; alkali metal iodides such as lithium iodide, sodium iodide, and potassium iodide; alkaline earth metal chlorides such as magnesium chloride and calcium chloride; alkaline earth metal bromides such as magnesium bromide and calcium bromide; earth metal halides such as aluminum chloride and aluminum bromide; zinc group metal halides such as zinc chloride and zinc bromide; carbon group metal halides such as tin chloride; transition metal halides such as manganese chloride, iron chloride, iron bromide, cobalt chloride, nickel chloride, nickel bromide, and zirconium oxychloride; amine hydrochlorides such as hydrazine hydrochloride, trimethylamine hydrochloride, triethylamine hydrochloride, ethanolamine hydrochloride, diethanolamine hydrochloride, triethanolamine hydrochloride, dimethylethanolamine hydrochloride, methyldiethanolamine hydrochloride, cyclohexylamine hydrochloride, ethylenediamine hydrochloride, diethylenetetramine hydrochloride, triethylenepentamine hydrochloride, and aniline hydrochloride; amino acid hydrochlorides such as alanine hydrochloride, arginine hydrochloride, lysine hydrochloride, and cysteine hydrochloride; ammonium salt halides such as ammonium chloride, ammonium bromide, tetrabutylammonium chloride, tetrabutylammonium bromide, and benzyltriethylammonium chloride; and phosphonium salt halides such as tetrabutylphosphonium chloride and tetraphenylphosphonium bromide.

These may be used alone or in a combination of two or more thereof. In particular, chloride salts are preferably used because the yield of silver nanowires is increased by using the chloride salts, and chloride salts and bromide salts are more preferably used in combination because silver nanowires having a smaller diameter can be obtained using the bromide salts. As chloride salts, lithium chloride, sodium chloride, potassium chloride, zirconium oxychloride, ammonium chloride, and benzyltriethylammonium chloride are preferably used, and sodium chloride is more preferably used. As bromide salts, sodium bromide, potassium bromide, ammonium bromide, and tetrabutylammonium bromide are preferably used, and sodium bromide is more preferably used.

In addition, chloride salts are used so that the molar ratio of chlorine atoms in the chloride salts to silver atoms in silver salts is preferably 0.001 to 0.5, more preferably 0.003 to 0.3, and still more preferably 0.008 to 0.1. By setting the molar ratio of chlorine atoms in the chloride salts to silver atoms in silver salts to 0.001 or more, the yield of silver nanowires is improved and silver nanowires which are in a better form can be obtained. In addition, by setting the molar ratio thereof to 0.5 or less, the yield of silver nanowires can be improved due to a reduced amount of a generated silver halide. In addition, the larger the ratio of chlorine atoms to bromine atoms produced through dissociation from the halide salt to be used (total number of moles of chlorine atoms in inorganic salts or organic salts/total number of moles of bromine atoms in inorganic salts or organic salts), the better the yield of silver nanowires, and the smaller the ratio thereof, the smaller diameter silver nanowires can be obtained. Therefore, the ratio thereof is preferably 0.01 to 15, more preferably 0.1 to 8, and still more preferably 1 to 5.

[Silver Salt]

The silver salt used in the present invention is not particularly limited as long as it is a silver compound reduced by a polyol, and at least one silver compound can be appropriately selected depending on the purpose. Specific examples of silver salts that can be used in the present invention include: inorganic acid salts such as silver nitrate, silver sulfate, silver sulfamate, silver chlorate, and silver perchlorate; and organic acid salts such as silver acetate and silver lactate. Among these, silver nitrate is preferably used. The halide salt and the silver salt may be the same substance used in combination. Examples of such compounds include silver chloride and silver bromide.

The silver salt used in the present invention based on a reaction solution is preferably used in an amount of 0.1 to 20 mass % and more preferably used in an amount of 0.2 to 10 mass % from the viewpoint of formation of favorable silver nanowires. Setting of the concentration of silver salts to 0.1 mass % or more is advantageous from the viewpoints of a large amount of silver nanowires generated and manufacturing costs. In addition, by setting the concentration thereof to 20 mass % or less, silver nanowires in a better form can be obtained.

[Furanone Derivative (a)]

The manufacturing method of the present invention is characterized in that, when silver nanowires are precipitated in a polyol, a furanone derivative (a) having a specific structure allowed to coexist therewith. The furanone derivative (a) used in the present invention is at least one selected from the group consisting of α-angelica lactone, phthalide, and a compound represented by General Formula (3) below.

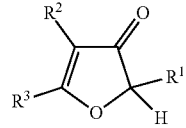

[General Formula (3)]

(In General Formula (3), $R^1$ and $R^3$ each represent an alkyl group having 1-4 carbon atoms, and $R^2$ represents a hydrogen atom, a hydroxyl group, an alkoxyl group having 1-4 carbon atoms, or an acyloxy group having 2-6 carbon atoms).

Among these furanone derivatives (a), examples thereof that can be preferably used from the viewpoint of availability include 2,5-dimethyl-3(2H)-furanone, 2,5-dimethyl-4-methoxy-3(2H)-furanone, 2,5-dimethyl-4-hydroxy-3(2H)-furanone, 4-acetoxy-2,5-dimethyl-3(2H)-furanone, 4-butyryloxy-2,5-dimethyl-3(2H)-furanone, α-angelica lactone, and phthalide. Among these, 2,5-dimethyl-4-methoxy-3(2H)-furanone, 2,5-dimethyl-4-hydroxy-3(2H)-furanone, and phthalide are more preferably used.

The furanone derivative (a) used in the present invention is used so that the molar ratio of the furanone derivative (a) to silver atoms in a silver salt is preferably 0.01 to 2.0, more preferably 0.04 to 0.60, and still more preferably 0.07 to 0.35. By setting the molar ratio of the furanone derivative (a) to silver atoms in a silver salt to 0.01 to 2.0, the proportion of wires having a larger diameter can be reduced and silver nanowires having a small average diameter can be obtained.

[α-Hydroxycarbonyl Compound (b)]

In the manufacturing method of the present invention, an α-hydroxycarbonyl compound (b) having a specific structure may be allowed to coexist with the furanone derivative (a). By using an α-hydroxycarbonyl compound (b) having a specific structure, the average diameter of silver nanowires to be obtained can be further reduced or the proportion of silver nanowires having a large diameter can be reduced. The α-hydroxycarbonyl compound (b) having a specific structure is a compound represented by General Formula (4) below.

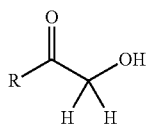
[General Formula (4)]

(In General Formula (4), R represents either a hydrogen atom or a hydrocarbon having 1-6 carbon atoms).

Specific examples thereof include hydroxyacetone, α-hydroxyacetophenone, 1-hydroxy-2-butanone, 1-hydroxy-2-pentanone, and 1-hydroxy-3-methyl-2-butanone. Among these, hydroxyacetone or α-hydroxyacetophenone is preferably used from the viewpoint of availability, and hydroxyacetone is more preferably used from the viewpoint of the shape of silver nanowires to be obtained.

The α-hydroxycarbonyl compound (b) used in the present invention is used so that the molar ratio of the α-hydroxycarbonyl compound (b) to silver atoms in a silver salt is preferably 0.1 to 9.0 and more preferably 0.5 to 3.5 from the viewpoint of the formation of favorable silver nanowires. By setting the molar ratio of the α-hydroxycarbonyl compound (b) to silver atoms in a silver salt to 0.1 or more, the proportion of silver nanowires having a larger diameter can be reduced. In addition, by setting the molar ratio of the α-hydroxycarbonyl compound (b) to silver atoms in a silver salt to 9.0 or less, preferred silver nanowires having a longer major axis length can be obtained.

[Other Reaction Solvents]

A reaction solvent in addition to the polyol may be added as a solvent used in the present invention to the extent that the solubility of a growth control agent or the formation of silver nanowires is not impaired. Examples thereof include: water; alcohols such as methanol and propanol; ketones such as methyl ethyl ketone and methyl isobutyl ketone; ethers such as ethylene glycol monomethyl ether, ethylene glycol dimethyl ether, diethylene glycol monomethyl ether, diethylene glycol dimethyl ether, ethylene glycol monomethyl ether acetate, propylene glycol monomethyl ether, tetrahydrofuran, and dioxane; and amides such as formamide, acetamide, N,N-dimethylformamide, N,N-dimethylacetamide, and N-methyl-2-pyrrolidinone, but the present invention is not limited thereto.

[Reaction Temperature]

The reaction temperature in the silver nanowire manufacturing method of the present invention may be any temperature as long as silver nanowires can be formed, but is preferably 50° C. to 200° C. and more preferably 100° C. to 180° C. in view of the facts that the manufacturing time of silver nanowires can be reduced as the temperature becomes higher and homogeneous wires are unlikely to be obtained in a case where the temperature is significantly high.

[Reaction Time]

The reaction time in the silver nanowire manufacturing method of the present invention can be arbitrarily set as long as silver nanowires can be formed, but is preferably within 72 hours from the viewpoint of manufacturing costs.

[Method for Incorporating Each Raw Material]

As the method for incorporating each raw material used in the present invention, each raw material may be dissolved in solvents such as a polyol or other reaction solvents to be used in advance to be then added to a reaction container, or solvents be used may be added to a reaction container and then each raw material may be added thereto. However, each raw material is preferably dissolved in solvents to be used in advance to be then added to a reaction container from the viewpoint of ease of homogeneous mixing. The order of incorporating each raw material is not particularly limited, but it is preferable that a first solution containing a furanone derivative (a) be mixed with a second solution containing a silver salt at a reaction temperature. At this time, a growth control agent, a halide salt, and other additives may be added to the first solution and the second solution or may be simultaneously mixed therewith as a separate solution, but are preferably added to the first solution. By extending the mixing time when mixing the first solution with the second solution, the major axis length of nanowires becomes longer. Therefore, the mixing is preferably performed over 5 minutes or longer, more preferably performed over 10 minutes or longer, and still more preferably performed over 20 minutes or longer. In addition, the mixing time is preferably within 720 minutes from the viewpoint of manufacturing costs.

The "nanowires" in the present invention are structures having a diameter of less than 1 μm and an aspect ratio (major axis length/diameter) of greater than or equal to 2. In addition, "fine particles" in the present invention are structures having a diameter of less than 1 μm and an aspect ratio (major axis length/diameter) of less than 2.

[Average Major Axis Length of Silver Nanowires]

A transparent conductive film containing silver nanowires exhibits conductivity due to a three-dimensional conductive network structure spatially widely distributed and formed by silver nanowires coming into contact with each other. Therefore, the average major axis length of nanowires is preferably long from the viewpoint of conductivity. On the other hand, nanowires that are too long are likely to be entangled, and therefore, short nanowires are preferable from the viewpoint of dispersion stability. The "average major axis length of silver nanowires" in the present invention is a value calculated using image processing software (trade name: Image-Pro Premier, manufactured by Media Cybernetics Inc.) by photographing 1,000 or more silver nanowires using a dark-field microscope (trade name: BX51 manufactured by Olympus Corporation). In the present invention, the average major axis length of silver nanowires is preferably 1 to 100 μm, more preferably 5 to 50 μm, and still more preferably 7 to 30 μm.

[Average Diameter of Silver Nanowires]

In a case where silver nanowires are used in a transparent conductive film, it is advantageous and preferable that the wires have a small average diameter in order to improve transparency. The "average diameter of silver nanowires" in the present invention is an average value of diameters measured by observing 100 or more silver nanowires using a scanning electron microscope (SEM; manufactured by JEOL Ltd., JSM-5610LV). In the present invention, the average diameter of silver nanowires is preferably less than 45 nm, more preferably less than 41 nm, still more preferably less than 36 nm, and particularly preferably less than 32 nm.

[Proportion of Silver Nanowires Raving Large Diameter]

In a case where silver nanowires are used in a transparent conductive film, it is advantageous and preferable that the proportion of silver nanowires having a large diameter be small in order to improve transparency. The "proportion of silver nanowires having a large diameter" in the present invention is a proportion of silver nanowires having a diameter of 60 nm or more contained in a silver nanowire dispersion liquid, and is a proportion of the number of silver nanowires having a diameter of 60 nm or more among 300 or more silver nanowires observed using a scanning electron microscope (SEM; manufactured by JEOL Ltd., JSM- 5610LV). In the present invention, the proportion of silver nanowires having a diameter of 60 or more is preferably less than 5.0%, more preferably less than 4.0%, and still more preferably less than 2.0%.

[Silver Nanowire Dispersion Liquid Manufacturing Step]

The silver nanowires obtained through the manufacturing method of the present invention are purified through a well-known method in the related art such as a centrifugation method, a filtration method, a decantation method, a hydraulic elutriation method, or a method for redispersing a reaction solution after precipitation using a solvent, and therefore are preferably used for manufacturing a silver nanowire dispersion liquid.

The purified silver nanowires are dispersed in a solvent to prepare a silver nanowire dispersion liquid. The solvent is not particularly limited as long as silver nanowires can be dispersed. Specific examples thereof include: water; alcohols such as methanol, ethanol, 1-propanol, 2-propanol, 1-butanol, 2-butanol, 2-methyl-1-propanol, 2-methyl-2-propanol, diacetone alcohol, benzyl alcohol, and terpineol; polyols such as ethylene glycol, propylene glycol, 1,3-propanediol, 1,3-butanediol, 1,4-butanediol, and glycerin; glycol ethers such as ethylene glycol monomethyl ether, ethylene glycol monoethyl ether, ethylene glycol monobutyl ether, diethylene glycol monoethyl ether, diethylene glycol monobutyl ether, propylene glycol monomethyl ether, and dipropylene glycol monomethyl ether; glymes such as ethylene glycol dimethyl ether, diethylene glycol dimethyl ether, ethylene glycol diethyl ether, diethylene glycol diethyl ether, triethylene glycol diethyl ether, and diethylene glycol dibutyl ether; glycol ether esters such as ethylene glycol monomethyl ether acetate, diethylene glycol monoethyl acetate, diethylene glycol monobutyl ether acetate, and propylene glycol monomethyl ether acetate; esters such as ethyl acetate, butyl acetate, ethyl propionate, and ethyl lactate; ketones such as acetone, methyl ethyl ketone, cyclohexanone, and 3-methyl-2-hexanone; aromatics such as toluene and xylene; and a solvent consisting of two or more thereof.

In addition, a resin may be incorporated for the purpose of improving dispersion stability when preparing a silver nanowire dispersion liquid. Specific examples of resins include polysaccharides such as methyl cellulose, ethyl cellulose, hydroxyethyl cellulose, hydroxypropyl cellulose, hydroxypropyl methylcellulose, carboxymethyl cellulose, nitrocellulose, cellulose acetate, guar gum, xanthan gum, tamarind seed gum, psyllium seed gum, ghatti gum, locust bean gum, hydroxyethyl guar gum, and hydroxypropyl guar gum and derivatives thereof; and poly(meth)acrylic resins, polyurethane resin, polyester resins, alkyd resins, epoxy resins, ethylene-vinyl acetate resins, and polyvinyl alcohol and derivatives thereof.

The silver nanowire dispersion liquid of the present invention can be used, for example, for forming a transparent conductive film which can be obtained by coating a substrate with the silver nanowire dispersion liquid through a well-known method. Specific examples of coating methods include a spin coating method, a slit coating method, a dip-coating method, a blade coating method, a bar coating method, a spray method, a letterpress printing method, an intaglio printing method, a screen-printing method, a planographic printing method, a dispensing method, and an ink jet method. In addition, coating may be repeated plural times using these coating methods.

A substrate having a transparent conductive film can be widely applied to various devices made of, for example, an electrode material for liquid crystal display, an electrode material for plasma display, an electrode material for organic electroluminescence display, an electrode material for electronic paper, an electrode material for a touch panel, an electrode material for a thin-film amorphous Si solar cell, an electrode material for a dye-sensitized solar cell, an electromagnetic wave shield material, and an antistatic material.

EXAMPLES

Hereinafter, the present invention will be described in detail based on examples, but is not limited to these examples.

Abbreviations of drugs in the text or in the tables mean the following.

PVP: Polyvinyl pyrrolidone
PG: Propylene glycol
BG: 1,3-Butanediol
NaCl: Sodium chloride
KCl: Potassium chloride
ZC: Zirconium oxychloride (zirconium oxychloride, octahydrate)
NaBr: Sodium bromide
KBr: Potassium bromide
BTEAC: Benzyltriethylammonium chloride
TBAB: Tetrabutylammonium bromide
DMMFO: 2,5-Dimethyl-4-methoxy-3(2H)-furanone
DMFO: 2,5-Dimethyl-3(2H)-furanone
DMHFO: 2,5-Dimethyl-4-hydroxy-3(2H)-furanone
ADMFO: 4-Acetoxy-2,5-dimethyl-3(2H)-furanone
BDMFO: 4-Butyryloxy-2,5-dimethyl-3(2H)-furanone
α-AL: α-Angelica lactone
HA: Hydroxyacetone
α-HAP: α-Hydroxyacetophenone Synthesis of Growth Control Agent 1

Synthesis Example 1

After adding 112.5 parts by mass of N-(2-hydroxyethyl)acrylamide, 37.5 parts by mass of N,N-diethylacrylamide, 50 parts by mass of propylene glycol, and 750 parts by mass of ion-exchanged water to a four-necked flask equipped with a stirrer, a thermometer, a reflux condenser, and a nitrogen gas introduction tube, the temperature was raised to 70° C. while feeding nitrogen gas. Next, 50 parts by mass of a propylene glycol solution containing 2,2'-azobis(2-methylbutyronitrile) at a concentration of 3 mass % was added thereto, the mixture was reacted at 90° C. for 3 hours to prepare a N-hydroxyethyl acrylamide/N,N-dimethylacrylamide copolymer. The weight-average molecular weight thereof obtained using Agilent 1100 HPLC system (manufactured by Agilent Technologies, Inc.) through a GPC-MALS method was 420,000.

Thereafter, 600 parts of propylene glycol was added to 400 parts of the reaction solution, and then, a distillate in an amount slightly larger than the theoretical amount of water contained was distilled off through vacuum distillation to perform solvent substitution. Propylene glycol was added to the solvent-substituted liquid in an amount required for adjusting the concentration of the solvent-substituted liquid to 6 mass % to obtain a propylene glycol solution containing a growth control agent 1 at a concentration of 6 mass % which was used for producing silver nanowires.

[Production of Silver Nanowires]

Example 1

6.87 parts by mass of polyvinyl pyrrolidone (manufactured by BASF, Sokalan (registered trademark) K90P) as a growth control agent, 815.61 parts by mass of propylene glycol as a polyol, and 5.35 parts by mass of a propylene glycol solution containing sodium chloride at a concentration of 1.5 mass % and 1.88 parts by mass of a propylene glycol solution containing sodium bromide at a concentration of 2.5 mass % as halide salts were added to a four-necked flask equipped with a stirrer, a thermometer, and a nitrogen introduction pipe while feeding nitrogen, and the mixture was stirred at room temperature for 30 minutes. Next, after raising the internal temperature to 145° C., 0.29 parts by mass of 2,5-dimethyl-4-methoxy-3(2H)-furanone as a furanone derivative (a) and 30 parts by mass of propylene glycol were added thereto and stirred for 10 minutes. Thereafter, 140.0 parts by mass of a propylene glycol solution containing silver nitrate at a concentration of 5 mass % as a silver salt was added thereto over 90 minutes while maintaining the internal temperature at 145° C., and the mixture was further stirred for 20 minutes to synthesize silver nanowires. Thereafter, the reaction solution was taken out, 100 parts by mass of water was added to 100 parts by mass of the reaction solution to dilute the reaction solution, and the reaction solution was subjected to suction filtration with a membrane filter. Furthermore, water was added onto the residue, and the suction filtration was repeated 5 tunes to isolate silver nanowires. The obtained silver nanowires were dispersed in an aqueous solvent to measure the physical property thereof. The measurement results are shown in Table 2.

Examples 2 to 21 and Comparative Examples 1 to 3

In Examples 2 to 21 and Comparative Examples 1 to 3, silver nanowires were obtained in the same manner as in Example 1 except that the conditions were changed as shown in Table 1. Under the condition that an α-hydroxycarbonyl compound (b) is used in combination, the α-hydroxycarbonyl compound (b) was added at the same time as a furanone derivative (a). Measurement results relating to the average diameter of the obtained silver nanowires and the proportion of wires having a diameter of 60 nm or more are shown in Table 2, and measurement results including the average major axis length for Examples 14 to 17 are shown in Table 3.

Example 22

600 parts by mass of the propylene glycol solution containing a growth control agent 1 at a concentration of 6 mass % obtained in Synthesis Example 1 as a growth control agent (36.0 parts by mass as the growth control agent 1), 239.26 parts by mass of propylene glycol as a polyol, 3.60 parts by mass of a propylene glycol solution containing zirconium oxychloride octahydrate at a concentration of 1.5 mass % and 15.97 parts by mass of a propylene glycol solution containing potassium bromide at a concentration of 2.5 mass % as halide salts, and 1.17 parts by mass of 2,5-dimethyl-4-methoxy-3(2H)-furanone as a furanone derivative (a) were added to a four-necked flask equipped with a stirrer, a thermometer, and a nitrogen introduction pipe while feeding nitrogen, and the mixture was stirred at room temperature for 30 minutes. Next, the internal temperature was raised to 120° C., and then, 140.0 parts by mass of a propylene glycol solution containing silver nitrate at a concentration of 5 mass % as a silver salt was added thereto over 40 minutes while maintaining the internal temperature at 120° C., and the mixture was further stirred for 20 minutes to synthesize silver nanowires. The silver nanowires were isolated from each of the obtained reaction solutions through the same method as that in Example 1, and the physical properties thereof were measured. The measurement results are shown in Table 2.

Comparative Example 4

A reaction solution was obtained in the same manner as in Example 22 except that no furanone derivative (a) was used. Formation of silver nanowires could not be confirmed from the obtained reaction solution.

Comparative Example 5

A reaction solution was obtained in the same manner as in Comparative Example 4 except that the reaction time after incorporating a propylene glycol solution containing silver nitrate was changed from 20 minutes to 140 minutes. The silver nanowires were isolated from each of the obtained reaction solutions through the same method as that in Example 1, and the physical properties thereof were measured. The measurement results are shown in Table 2.

TABLE 1

| | Silver salt | | Growth control agent | | Polyol | Halide salt | | | |
|---|---|---|---|---|---|---|---|---|---|
| | | 5 mass % solution | | | | Chloride | 1.5 mass % solution (parts by | Bromide | 2.5 mass % solution (parts by |
| | Type | (parts by mass) | Type | Parts by mass | Type | salt | mass) | salt | mass) |
| Example 1 | Silver nitrate | 140 | PVP | 6.87 | PG | NaCl | 5.35 | NaBr | 1.88 |
| Example 2 | Silver nitrate | 140 | PVP | 6.87 | PG | NaCl | 5.35 | NaBr | 1.88 |
| Example 3 | Silver nitrate | 140 | PVP | 6.87 | PG | NaCl | 5.35 | NaBr | 1.88 |
| Example 4 | Silver nitrate | 140 | PVP | 6.87 | PG | NaCl | 5.35 | NaBr | 1.88 |
| Example 5 | Silver nitrate | 140 | PVP | 6.87 | PG | NaCl | 5.35 | NaBr | 1.88 |
| Example 6 | Silver nitrate | 140 | PVP | 6.87 | PG | NaCl | 5.35 | NaBr | 1.88 |
| Example 7 | Silver nitrate | 140 | PVP | 6.87 | PG | NaCl | 5.35 | NaBr | 1.88 |
| Example 8 | Silver nitrate | 140 | PVP | 6.87 | PG | NaCl | 5.35 | NaBr | 1.88 |
| Example 9 | Silver nitrate | 140 | PVP | 6.87 | PG | NaCl | 5.35 | NaBr | 1.88 |
| Example 10 | Silver nitrate | 140 | PVP | 6.87 | PG | NaCl | 5.35 | NaBr | 1.88 |
| Example 11 | Silver nitrate | 140 | PVP | 6.87 | PG | NaCl | 5.35 | NaBr | 1.88 |
| Example 12 | Silver nitrate | 140 | PVP | 6.87 | PG | NaCl | 5.35 | NaBr | 1.88 |
| Example 13 | Silver nitrate | 140 | PVP | 6.87 | PG | NaCl | 5.35 | NaBr | 1.88 |
| Example 14 | Silver nitrate | 140 | PVP | 6.87 | PG | NaCl | 5.35 | NaBr | 1.88 |

TABLE 1-continued

| | | | | | | | | | |
|---|---|---|---|---|---|---|---|---|---|
| Example 15 | Silver nitrate | 140 | PVP | 6.87 | PG | NaCl | 5.35 | NaBr | 1.88 |
| Example 16 | Silver nitrate | 140 | PVP | 6.87 | PG | NaCl | 5.35 | NaBr | 1.88 |
| Example 17 | Silver nitrate | 140 | PVP | 6.87 | PG | NaCl | 5.35 | NaBr | 1.88 |
| Example 18 | Silver nitrate | 140 | PVP | 6.87 | PG | NaCl | 5.35 | NaBr | 1.88 |
| Example 19 | Silver nitrate | 140 | PVP | 6.87 | PG | NaCl | 5.35 | NaBr | 1.88 |
| Example 20 | Silver nitrate | 140 | PVP | 6.87 | PG | KCl | 6.83 | KBr | 2.18 |
| Example 21 | Silver nitrate | 140 | PVP | 6.87 | BG | BTEAC | 20.86 | TBAB | 5.90 |
| Example 22 | Silver nitrate | 140 | Growth control agent 1 | 36.0 | PG | ZC | 3.60 | KBr | 15.97 |
| Comparative Example 1 | Silver nitrate | 140 | PVP | 6.87 | PG | NaCl | 5.35 | NaBr | 1.88 |
| Comparative Example 2 | Silver nitrate | 140 | PVP | 6.87 | PG | NaCl | 5.35 | NaBr | 1.88 |
| Comparative Example 3 | Silver nitrate | 140 | PVP | 6.87 | BG | BTEAC | 20.86 | TBAB | 5.90 |
| Comparative Example 4 | Silver nitrate | 140 | Growth control agent 1 | 36.0 | PG | ZC | 3.60 | KBr | 15.97 |
| Comparative Example 5 | Silver nitrate | 140 | Growth control agent 1 | 36.0 | PG | ZC | 3.60 | KBr | 15.97 |

| | Furanone derivative (a) | | α-Hydroxycarbonyl compound (b) | | Molar ratio of (a) to silver atoms in silver salt | Molar ratio of (b) to silver atoms in silver salt |
|---|---|---|---|---|---|---|
| | Type | Parts by mass | Type | Parts by mass | | |
| Example 1 | DMMFO | 0.29 | None | 0 | 0.05 | 0 |
| Example 2 | DMMFO | 0.44 | None | 0 | 0.075 | 0 |
| Example 3 | DMMFO | 0.59 | None | 0 | 0.1 | 0 |
| Example 4 | DMMFO | 1.17 | None | 0 | 0.2 | 0 |
| Example 5 | DMMFO | 1.76 | None | 0 | 0.3 | 0 |
| Example 6 | DMMFO | 2.93 | None | 0 | 0.5 | 0 |
| Example 7 | DMFO | 0.92 | None | 0 | 0.2 | 0 |
| Example 8 | DMHFO | 1.06 | None | 0 | 0.2 | 0 |
| Example 9 | ADMFO | 1.40 | None | 0 | 0.2 | 0 |
| Example 10 | BDMFO | 1.63 | None | 0 | 0.2 | 0 |
| Example 11 | α-AL | 0.20 | None | 0 | 0.05 | 0 |
| Example 12 | α-AL | 0.81 | None | 0 | 0.2 | 0 |
| Example 13 | Phthalide | 1.11 | None | 0 | 0.2 | 0 |
| Example 14 | DMMFO | 1.17 | HA | 0.61 | 0.2 | 0.2 |
| Example 15 | DMMFO | 1.17 | HA | 1.83 | 0.2 | 0.6 |
| Example 16 | DMMFO | 1.17 | HA | 9.16 | 0.2 | 3.0 |
| Example 17 | DMMFO | 1.17 | HA | 24.42 | 0.2 | 8.0 |
| Example 18 | DMHFO | 1.06 | HA | 1.83 | 0.2 | 0.6 |
| Example 19 | DMMFO | 1.17 | α-HAP | 3.37 | 0.2 | 0.6 |
| Example 20 | Phthalide | 1.11 | None | 0 | 0.2 | 0 |
| Example 21 | Phthalide | 1.11 | None | 0 | 0.2 | 0 |
| Example 22 | DMMFO | 1.17 | None | 0 | 0 | 0 |
| Comparative Example 1 | None | 0 | None | 0 | 0 | 0 |
| Comparative Example 2 | Ascorbic acid | 1.45 | None | 0 | 0.2 | 0 |
| Comparative Example 3 | None | 0 | None | 0 | 0 | 0 |
| Comparative Example 4 | None | 0 | None | 0 | 0 | 0 |
| Comparative Example 5 | None | 0 | None | 0 | 0 | 0 |

TABLE 2

| | Silver nanowire evaluation results | |
|---|---|---|
| | Average diameter (nm) | Proportion of wires having diameter of 60 nm or more |
| Example 1 | 40 | 4.3% |
| Example 2 | 35 | 2.0% |
| Example 3 | 32 | Less than 1% |
| Example 4 | 34 | 3.0% |
| Example 5 | 35 | 2.7% |
| Example 6 | 42 | 4.0% |
| Example 7 | 38 | 2.3% |
| Example 8 | 33 | 1.0% |
| Example 9 | 37 | 2.0% |
| Example 10 | 36 | 2.0% |
| Example 11 | 43 | 4.3% |
| Example 12 | 38 | 2.7% |
| Example 13 | 32 | 1.7% |
| Example 14 | 31 | 2.3% |
| Example 15 | 30 | 1.3% |
| Example 16 | 29 | Less than 1% |
| Example 17 | 30 | Less than 1% |
| Example 18 | 28 | Less than 1% |
| Example 19 | 33 | 1.7% |
| Example 20 | 34 | 3.3% |

TABLE 2-continued

| | Silver nanowire evaluation results | |
|---|---|---|
| | Average diameter (nm) | Proportion of wires having diameter of 60 nm or more |
| Example 21 | 38 | 2.3% |
| Example 22 | 39 | 3.0% |
| Comparative Example 1 | 49 | 13% |
| Comparative Example 2 | 45 | 8.3% |
| Comparative Example 3 | 48 | 11% |
| Comparative Example 4 | — | — |
| Comparative Example 5 | 51 | 12% |

From the results of Examples 1 to 20 and Comparative Example 1 and Example 21 and Comparative Example 3, use of the furanone derivative (a) defined in the present invention in combination can make the average diameter of the silver nanowires smaller than that of silver nanowires manufactured through a method in the related art and can reduce the proportion of wires having a diameter of 60 nm or more.

In Comparative Example 2 in which ascorbic acid that is a type of furanone other than the furanone derivative (a) defined in the present invention is used, the average diameter and the proportion of wires having a diameter of 60 nm or more are increased compared to Examples 1 to 20. That is, it can be seen that the furanone derivative (a) defined in the present invention has a high effect of reducing the average diameter of silver nanowires and reducing the proportion of wires having a diameter of 60 nm or more compared to other furanone derivatives.

Next, when comparing Example 22 in which a growth control agent different from that of Examples 1 to 20 was used with Comparative Examples 4 and 5, it can be seen that no silver nanowire was formed in Comparative Example 4 produced under the same conditions as those of Example 22 except that the furanone derivative (a) defined in the present invention was not used in combination and that although silver nanowires are obtained in Comparative Example 5 in which the reaction time is further extended to obtain the silver nanowires, the average diameter and the proportion of wires having a diameter of 60 nm or more do not reach a desired level compared to Example 22. From this, it can be said that, even if the growth control agent is changed, use of the furanone derivative (a) defined in the present invention in combination can make the average diameter of the silver nanowires smaller than that of silver nanowires manufactured through a method in the related art and can further reduce the proportion of wires having a diameter of 60 nm or more.

Since the molar ratio of the furanone derivative (a) silver atoms in a silver salt in Examples 2 to 5 is within a more preferred range compared to Examples 1 and 6, silver nanowires having a more preferred average diameter can be obtained.

Since more preferred furanone derivatives (a) are used in Examples 4, 8, and 13 compared to Examples 7, 9, 10, and 12, silver nanowires having a more preferred average diameter can be obtained.

Since a more preferred furanone derivative (a) is used in Example 1 compared to Example 11, silver nanowires having a more preferred average diameter can be obtained.

In Examples 14 to 19, silver nanowires having a smaller average diameter (34 nm⇒29 to 33 nm, 33 nm⇒28 nm) and a lower proportion (3.0%⇒less than 1% to 2.3%, 1.0%⇒less than 1%) of wires having a diameter of 60 nm or more compared to Examples 4 and 8 produced under the same conditions except that α-hydroxycarbonyl compounds (b) were not used in combination were obtained.

TABLE 3

| | Example 14 | Example 15 | Example 16 | Example 17 |
|---|---|---|---|---|
| Average diameter (nm) | 31 | 30 | 29 | 30 |
| Proportion of wires having diameter of 60 nm or more | 2.3% | 1.3% | Less than 1% | Less than 1% |
| Average major axis length (μm) | 13.5 | 13.4 | 11.2 | 6.4 |

It can be seen from the results of Table 3 that, in Examples 15 and 16, silver nanowires with a lower proportion of wires having a diameter of 60 nm or more compared to Example 14 in which the molar ratio of the α-hydroxycarbonyl compound (b) to silver atoms in a silver salt is less than the lower limit of the more preferred range are obtained.

It can be seen from the results of Table 3 that, in Examples 15 and 16, silver nanowires having a more preferred average major axis length of wires compared to Example 17 in which the molar ratio of the α-hydroxycarbonyl compound (b) to silver atoms silver salt exceeds the upper limit of the more preferred range are obtained.

What is claimed is:

1. A method for manufacturing silver nanowires, comprising:
    obtaining silver nanowires from a silver salt by a reduction reaction in a polyol acting as a solvent and a reducing agent in the presence of a halide salt, a growth control agent, and at least one furanone derivative (a) selected from the group consisting of α-angelica lactone, phthalide, and a compound represented by General Formula (1),

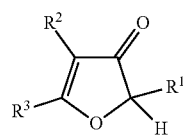

[General Formula (1)]

in General Formula (1), $R^1$ and $R^3$ each represent an alkyl group having 1-4 carbon atoms, and $R^2$ represents a hydrogen atom, a hydroxyl group, an alkoxyl group having 1-4 carbon atoms, or an acyloxy group having 2-6 carbon atoms.

2. The method for manufacturing silver nanowires according to claim 1, wherein a molar ratio of the furanone derivative (a) to silver atoms in the silver salt is 0.07 to 0.35.

3. The method for manufacturing silver nanowires according to claim 2, wherein the furanone derivative (a) is at least one selected from the group consisting of 2,5-dimethyl-4-methoxy-3(2H)-furanone, 2,5-dimethyl-4-hydroxy-3(2H)-furanone, and phthalide.

4. The method for manufacturing silver nanowires according to claim 3, further comprising:

carrying out the reduction reaction in the presence of an α-hydroxycarbonyl compound (b) represented by General Formula (2) coexisting with the furanone derivative (a), (b)

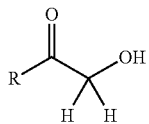

[General Formula (2)]

in General Formula (2), R represents either a hydrogen atom or a hydrocarbon having 1-6 carbon atoms.

5. The method for manufacturing silver nanowires according to claim 4, wherein the α-hydroxycarbonyl compound (b) is hydroxyacetone and/or α-hydroxyacetophenone.

6. The method for manufacturing silver nanowires according to claim 5, wherein a molar ratio of the α-hydroxycarbonyl compound (b) to silver atoms in the silver salt is 0.5 to 3.5.

7. The method for manufacturing silver nanowires according to claim 4, wherein a molar ratio of the α-hydroxycarbonyl compound (b) to silver atoms in the silver salt is 0.5 to 3.5.

8. The method for manufacturing silver nanowires according to claim 2, further comprising:
carrying out the reduction reaction in the presence of an α-hydroxycarbonyl compound (b) represented by General Formula (2) coexisting with the furanone derivative (a), (b)

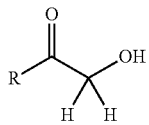

[General Formula (2)]

in General Formula (2), R represents either a hydrogen atom or a hydrocarbon having 1-6 carbon atoms.

9. The method for manufacturing silver nanowires according to claim 8, wherein the α-hydroxycarbonyl compound (b) is hydroxyacetone and/or α-hydroxyacetophenone.

10. The method for manufacturing silver nanowires according to claim 9, wherein a molar ratio of the α-hydroxycarbonyl compound (b) to silver atoms in the silver salt is 0.5 to 3.5.

11. The method for manufacturing silver nanowires according to claim 8, wherein a molar ratio of the α-hydroxycarbonyl compound (b) to silver atoms in the silver salt is 0.5 to 3.5.

12. The method for manufacturing silver nanowires according to claim 1, wherein the furanone derivative (a) is at least one selected from the group consisting of 2,5-dimethyl-4-methoxy-3(2H)-furanone, 2,5-dimethyl-4-hydroxy-3(2H)-furanone, and phthalide.

13. The method for manufacturing silver nanowires according to claim 12, further comprising:
carrying out the reduction reaction in the presence of an α-hydroxycarbonyl compound (b) represented by General Formula (2) coexisting with the furanone derivative (a), (b)

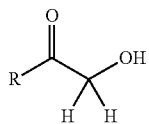

[General Formula (2)]

in General Formula (2), R represents either a hydrogen atom or a hydrocarbon having 1-6 carbon atoms.

14. The method for manufacturing silver nanowires according to claim 13, wherein the α-hydroxycarbonyl compound (b) is hydroxyacetone and/or α-hydroxyacetophenone.

15. The method for manufacturing silver nanowires according to claim 14, wherein a molar ratio of the α-hydroxycarbonyl compound (b) to silver atoms in the silver salt is 0.5 to 3.5.

16. The method for manufacturing silver nanowires according to claim 13, wherein a molar ratio of the α-hydroxycarbonyl compound (b) to silver atoms in the silver salt is 0.5 to 3.5.

17. The method for manufacturing silver nanowires according to claim 1, further comprising:
carrying out the reduction reaction in the presence of an α-hydroxycarbonyl compound (b) represented by General Formula (2) coexisting with the furanone derivative (a), (b)

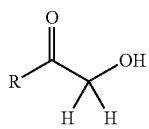

[General Formula (2)]

in General Formula (2), R represents either a hydrogen atom or a hydrocarbon having 1-6 carbon atoms.

18. The method for manufacturing silver nanowires according to claim 17, wherein the α-hydroxycarbonyl compound (b) is hydroxyacetone and/or α-hydroxyacetophenone.

19. The method for manufacturing silver nanowires according to claim 18, wherein a molar ratio of the α-hydroxycarbonyl compound (b) to silver atoms in the silver salt is 0.5 to 3.5.

20. The method for manufacturing silver nanowires according to claim 17, wherein a molar ratio of the α-hydroxycarbonyl compound (b) to silver atoms in the silver salt is 0.5 to 3.5.

* * * * *